(12) United States Patent
Dietze (10) Patent No.: US 11,804,639 B2
(45) Date of Patent: **\*Oct. 31, 2023**

(54) MULTISTAGE PLUNGER SYSTEMS AND METHODS FOR FORMING BATTERY CELL TABS

(71) Applicant: GM GLOBAL TECHNOLOGY OPERATIONS LLC, Detroit, MI (US)

(72) Inventor: Robert H. Dietze, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 673 days.

This patent is subject to a terminal disclaimer.

(21) Appl. No.: 16/937,018

(22) Filed: Jul. 23, 2020

(65) Prior Publication Data

US 2022/0029141 A1    Jan. 27, 2022

(51) Int. Cl.
*B21D 37/08*    (2006.01)
*B21D 31/00*    (2006.01)
(Continued)

(52) U.S. Cl.
CPC ............ *H01M 50/553* (2021.01); *B21D 7/08* (2013.01); *B21D 11/10* (2013.01); *B21D 31/005* (2013.01);
(Continued)

(58) Field of Classification Search
CPC ............. H01M 10/04; H01M 10/0404; H01M 50/514; H01M 50/54; H01M 50/564; B21D 5/00; B21D 5/16; B21D 11/10; B21D 31/005; B21D 37/08; B21D 39/02; Y10T 29/49108; Y10T 29/53139
See application file for complete search history.

(56) References Cited

U.S. PATENT DOCUMENTS

| 4,764,182 | A | * | 8/1988 | Bish | ...................... | H01M 50/54 |
| | | | | | | 29/730 |
| 5,023,752 | A | | 6/1991 | Detter et al. | | |

(Continued)

FOREIGN PATENT DOCUMENTS

CN    103050735 B    *    2/2015
CN    104396050 A    *    3/2015    ........ H01M 10/0413
(Continued)

*Primary Examiner* — Matthew P Travers
(74) *Attorney, Agent, or Firm* — Quinn IP Law (57) ABSTRACT

Presented are metalworking systems for forming metallic workpieces, methods for making/operating such metalworking systems, and battery module cell tabs bent by a multistage cluster-and-bend press. A metalworking system includes a grouping tool and a contouring tool that both align adjacent a workpiece support structure, such as a base plate of a battery module housing buttressing a stack of battery pouch cells. The grouping tool, which may include a first reciprocating plunger or plunger head, presses together a stack of metallic workpieces to thereby form a workpiece set having a first bend profile and a first length. The contouring tool, which may include a second reciprocating plunger or a pair of plunger fingers mounted on the plunger head, is attached to the grouping tool and bends the workpiece set to a second bend profile, distinct from the first bend profile, and a second set length, shorter than the first set length.

15 Claims, 5 Drawing Sheets

(51) Int. Cl.

| | | |
|---|---|---|
| *B21D 11/10* | (2006.01) | |
| *H01M 50/553* | (2021.01) | |
| *H01M 50/211* | (2021.01) | |
| *H01M 50/55* | (2021.01) | |
| *B23P 19/02* | (2006.01) | |
| *B23P 19/04* | (2006.01) | |
| *B23P 19/10* | (2006.01) | |
| *H01M 10/04* | (2006.01) | |
| *H01M 50/516* | (2021.01) | |
| *B21D 39/02* | (2006.01) | |
| *H01M 50/514* | (2021.01) | |
| *H01M 50/54* | (2021.01) | |
| *H01M 50/564* | (2021.01) | |
| *B21D 7/08* | (2006.01) | |

(52) U.S. Cl.
CPC ............. *B21D 39/02* (2013.01); *B23P 19/02* (2013.01); *B23P 19/04* (2013.01); *B23P 19/10* (2013.01); *H01M 10/0404* (2013.01); *H01M 50/211* (2021.01); *H01M 50/514* (2021.01); *H01M 50/516* (2021.01); *H01M 50/54* (2021.01); *H01M 50/55* (2021.01); *H01M 50/564* (2021.01)

(56) References Cited

U.S. PATENT DOCUMENTS

| | | | |
|---|---|---|---|
| 6,103,075 A | | 8/2000 | Winsel et al. |
| 6,639,385 B2 | | 10/2003 | Verbrugge et al. |
| 6,641,942 B1 | | 11/2003 | Rouillard et al. |
| 7,109,685 B2 | | 9/2006 | Tate, Jr. et al. |
| 7,324,902 B2 | | 1/2008 | Verbrugge et al. |
| 7,373,264 B2 | | 5/2008 | Verbrugge et al. |
| 7,612,532 B2 | | 11/2009 | Verbrugge |
| 7,768,233 B2 | | 8/2010 | Lin et al. |
| 7,928,690 B2 | | 4/2011 | Koch et al. |
| 8,035,986 B2 | | 10/2011 | Koetting et al. |
| 8,054,046 B2 | | 11/2011 | Lin et al. |
| 8,108,160 B2 | | 1/2012 | Liu et al. |
| 8,170,818 B2 | | 5/2012 | Lin et al. |
| 8,198,864 B2 | | 6/2012 | Koch et al. |
| 8,212,519 B2 | | 7/2012 | Koch et al. |
| 8,321,164 B2 | | 11/2012 | Liu et al. |
| 8,353,970 B2 | | 1/2013 | Wells et al. |
| 8,581,543 B2 | | 11/2013 | Koch et al. |
| 8,645,088 B2 | | 2/2014 | Schaefer et al. |
| 8,836,280 B2 | | 9/2014 | Koch et al. |
| 9,172,118 B2 | | 10/2015 | Marsh et al. |
| 9,176,194 B2 | | 11/2015 | Meisner et al. |
| 9,178,192 B2 | | 11/2015 | Payne |
| 9,337,484 B2 | | 5/2016 | Verbrugge et al. |
| 9,354,277 B2 | | 5/2016 | Lin et al. |
| 9,461,490 B2 | | 10/2016 | Ying |
| 9,513,338 B2 | | 12/2016 | Koch et al. |
| 11,387,525 B2 * | | 7/2022 | Austin ................ H01M 50/531 |
| 2003/0235736 A1 | | 12/2003 | Yung-Jen |
| 2011/0309838 A1 | | 12/2011 | Jian et al. |
| 2012/0121967 A1 * | | 5/2012 | Nakamura ............ H01M 10/05 429/163 |
| 2012/0202105 A1 * | | 8/2012 | Shinyashiki ........ H01M 10/052 429/153 |
| 2012/0244423 A1 * | | 9/2012 | Kusukawa ........... H01M 50/186 429/178 |
| 2014/0297084 A1 | | 10/2014 | Meisner et al. |
| 2015/0017508 A1 | | 1/2015 | Khakhalev |
| 2015/0162571 A1 | | 6/2015 | Ogg et al. |
| 2015/0301116 A1 | | 10/2015 | Baker et al. |
| 2015/0318502 A1 | | 11/2015 | Kanai |
| 2016/0039419 A1 | | 2/2016 | Wampler et al. |
| 2016/0077160 A1 | | 3/2016 | Wampler, II et al. |
| 2016/0254562 A1 | | 9/2016 | Morris-Cohen et al. |
| 2016/0259011 A1 | | 9/2016 | Joe |
| 2016/0293991 A1 | | 10/2016 | Goeltz et al. |
| 2016/0336552 A1 | | 11/2016 | MacLean et al. |
| 2016/0372777 A1 | | 12/2016 | Buckley et al. |
| 2017/0077507 A1 | | 3/2017 | Harada et al. |
| 2017/0285090 A1 | | 10/2017 | Dietze et al. |
| 2018/0226653 A1 * | | 8/2018 | Yamamoto ............ B23K 26/32 |
| 2018/0375132 A1 | | 12/2018 | Li et al. |
| 2019/0126770 A1 | | 5/2019 | Koch et al. |
| 2019/0148705 A1 * | | 5/2019 | Park .................... H01M 50/533 429/452 |
| 2019/0157710 A1 | | 5/2019 | Makino et al. |
| 2020/0365863 A1 * | | 11/2020 | Kim ..................... B23K 37/04 |
| 2021/0280836 A1 * | | 9/2021 | Austin ................ H01M 50/514 |
| 2021/0280841 A1 * | | 9/2021 | Aizawa ............... H01M 50/538 |
| 2022/0416374 A1 * | | 12/2022 | Li ...................... H01M 50/536 |

FOREIGN PATENT DOCUMENTS

| | | | |
|---|---|---|---|
| CN | 210208184 U | * | 3/2020 |
| DE | 102021103333 A1 | | 9/2021 |
| KR | 101880138 B1 | * | 7/2018 |

* cited by examiner

MULTISTAGE PLUNGER SYSTEMS AND METHODS FOR FORMING BATTERY CELL TABS

INTRODUCTION

The present disclosure relates generally to metalworking techniques for forming metallic workpieces. More specifically, aspects of this disclosure relate to automated manufacturing systems for bending battery cell tabs.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and rotary engines, as some non-limiting examples. Hybrid electric and full electric ("electric-drive") vehicles, on the other hand, utilize alternative power sources to propel the vehicle and, thus, minimize or eliminate reliance on a fossil-fuel based engine for tractive power.

A full electric vehicle (FEV)—colloquially branded as an "electric car"—is a type of electric-drive vehicle configuration that altogether removes the internal combustion engine and attendant peripheral components from the powertrain system, relying solely on electric traction motors for vehicle propulsion. The engine assembly, fuel supply system, and exhaust system of an ICE-based vehicle are replaced with a single or multiple traction motors, a traction battery pack, and battery cooling and charging hardware in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

Most commercially available hybrid electric and full electric vehicles employ a rechargeable traction battery pack to store and supply the requisite power for operating the powertrain's traction motor(s). In order to generate tractive power with sufficient vehicle range and speed, a traction battery pack is significantly larger, more powerful, and higher in capacity (Amp-hr) than a standard 12-volt starting, lighting, and ignition (SLI) battery. Contemporary traction battery packs (also referred to as "electric vehicle battery" or "EVB") group stacks of battery cells into individual battery modules that are mounted onto the vehicle chassis, e.g., via a battery housing and/or support tray. Stacked electrochemical battery cells may be connected in series or parallel through use of an electrical interconnect board (ICB). The electrical tabs of the individual battery cells, which project out from the module housing, are bent against and welded to shared busbar plates. A dedicated Battery Pack Control Module (BPCM), through collaborative operation with a Powertrain Control Module (PCM), regulates the opening and closing of battery pack contactors to govern operation of the battery pack for powering the vehicle's traction motor(s).

SUMMARY

Presented herein are metalworking systems with attendant control logic for forming metallic workpieces, methods for making and methods for operating such systems, and traction battery packs with discrete groups of battery cell tabs formed by a multistage cluster-and-bend apparatus. By way of illustration, battery cell tab forming presses are presented for module tab set bend operations. During construction of a battery electric vehicle (BEV) traction battery pack, for example, a group of lithium ion soft polymer pouch cells are stacked in face-to-face relation and seated on a base plate of a battery module housing. Electrical tabs projecting from opposite ends of the battery cell pouches are pressed together and bent, as described below, e.g., into discrete sets of three. The battery pouch cells are subsequently covered with a module jacket bearing an integrated interconnect board (ICB) assembly. These cell tab sets project outward from opposing ends of the battery module housing, extending through individual openings in the module jacket. Once the battery module is assembled, the stacked cell tabs are bent, e.g., to a 90±5-degree (deg.) angle, into contact with the ICB's externally mounted electrical busbar plates; the cell tabs are thereafter welded, soldered, or clipped to the busbar plates.

To provide the requisite pre-jacket pressing and bending noted above, a multistage battery cell tab forming press sequentially groups together and then contours the module tab sets into a desired final shape and length. During a first forming stage, a cell tab comb of the forming press is lowered into engagement with one end of the battery module to retain the cell tabs in predefined positions and operatively align the tool head with the battery pouch cells. The cell tab comb helps to prevent the cell tabs from prematurely collapsing, isolate the correct bend points for the cell tabs, and provide a positive stop for the tab-contouring tool. For the second forming stage, a tab-grouping tool is plunged towards the battery cells to concomitantly segregate and cluster the individual cell tabs into distinct sets. The tab-grouping tool simultaneously positions all cell tabs on a given end of the module into their proper groups and produces an initial bend geometry in each group. While the tab-grouping tool is in situ pressing against the cell tabs, a tab-contouring tool is plunged against or swept across the grouped cell tabs to contour and size each tab group, during a third forming stage. The tab-contouring tool simultaneously produces a final pre-stack bend geometry in the tab groups and sets a desired length of each group to accommodate the packaging design of the ICB. The grouping and contouring tools may be two distinct plungers—outer and inner bend platens—that operate in tandem with each other in a two-stage plunging operation, or may be a single tool head—a plungeable bend unit—with multiple pairs of crimping fingers that operate to simultaneously group and bend the tabs in a two-stage plunge and sweep operation.

Attendant benefits for at least some of the disclosed concepts include battery cell tab forming systems and methods that provide for the simultaneous grouping and bending of the module tab sets, which may be performed after (rather than before) stacking of the battery cells. This, in turn, eliminates the need for individual tab bending procedures and, thus, allows for a reduction in manufacturing time and cost. Other attendant benefits may include providing a single tool to concurrently form the module's cell tab sets, which helps to eliminate multiple bend stations and bend dies, reduce base engineering content (BEC), minimize set-to-set variations, and eliminate call sequencing and track & trace assembly procedures. Disclosed systems, methods and devices may also help to compensate for varying cell positions in the stack, and offset the "marshmallow effect" caused by variances in foam compression spacing.

Presented herein are manufacturing tools and systems for shaping workpieces. In an example, there is presented an automated or manually operated metalworking system for forming metallic workpieces (e.g., two or more electrical battery cell tabs). The metalworking system includes a grouping tool and a contouring tool that both align adjacent a workpiece support structure, such as a base plate of a battery module housing that is buttressing thereon a stack of battery pouch cells. The grouping tool, which may be in the form of a reciprocating plunger or a reciprocating plunger head, presses together a stack of metallic workpieces to thereby form a workpiece set having an initial (first) bend profile and an initial (first) set length. The contouring tool, which may be in the form of another reciprocating plunger or a pair of plunger fingers mounted on the plunger head, is coupled to, integrally formed with, or otherwise attached to the grouping tool. The contouring tool selectively bends the workpiece set to a final (second) bend profile and a final (second) set length, distinct from the initial bend profile and set length, respectively.

Also presented herein are processes for manufacturing any of the disclosed battery modules and processes for operating any of the disclosed manufacturing systems. In an example, a method is presented for forming one or more sets of metallic workpieces. This representative method includes, in any order and in any combination with any of the above and below disclosed options and features: aligning, adjacent a workpiece support structure, a grouping tool with a contouring tool attached thereto; plunging the grouping tool towards the support structure to press together a stack of two or more metallic workpieces to thereby form a workpiece set having an initial (first) bend profile and length; and activating the contouring tool to thereby bend the workpiece set to a final (second) bend profile and length, distinct from the initial bend profile and length, respectively.

For any of the disclosed systems, methods, and devices, the grouping tool includes a movable (first) plunger with a respective plunger body having a die cavity recessed into a contact face of its plunger body. For applications in which the grouping tool is forming multiple workpiece sets from the stack of workpieces, the movable plunger's contact face may include multiple die cavities (one per set). When this plunger is depressed, the contact face simultaneously contacts all of the metallic workpieces. In this instance, each plunger die cavity may include a pair of (first and second) cavity surfaces that simultaneously press against and bend the metallic workpieces towards each other to thereby form the workpiece set. As yet a further option, a discrete (first) elongated slot may segregate the plunger's (first and second) cavity surfaces and slidably receive therein distal ends of the metallic workpieces when initiating the initial (first) bend profile.

For any of the disclosed systems, methods, and devices, the contouring tool includes a distinct (second) plunger that is movably coupled to the movable (first) plunger and includes a respective (second) plunger body having a die cavity recessed into a contact face of its plunger body. Similar to the movable (first) plunger described above, the distinct (second) plunger's contact face may include multiple die cavities (one per set). When this plunger is depressed, the contact face simultaneously contacts all of the metallic workpieces of the workpiece set(s). In this instance, each die cavity may include a pair of (third and fourth) cavity surfaces that simultaneously press against and bend the workpiece set to thereby impart the final (second) bend profile and length. As yet a further option, a distinct (second) elongated slot may segregate the plunger's (third and fourth) cavity surfaces and slidably receive therein distal ends of the metallic workpieces when initiating the final (second) bend profile. One plunger may be hollow with a plunger passage extending through its plunger body; the other plunger is slidably mounted to the hollow plunger with the former's plunger body passing through the plunger passage in order to impart the final bend to the metallic workpieces.

For any of the disclosed systems, methods, and devices, the grouping tool may include a reciprocating plunger head that movably mounts adjacent the support structure. The plunger head includes a pair of (first and second) contact surfaces that simultaneously press against and bend the metallic workpieces towards each other to thereby form the workpiece set. In this instance, the contouring tool may include a pair of (first and second) plunger fingers rotatably mounted to the plunger head. For applications in which the tool is bending multiple workpiece sets from the stack of workpieces, the contouring tool may include multiple pairs of plunger fingers (one pair per set). Each plunger finger in a pair swivels in a respective direction to thereby press against and bend one of the metallic workpieces. Moreover, each contact surface may be defined on a respective contact face of one of the plunger fingers. The plunger head may translate along a rectilinear plunger axis in a reciprocating motion towards and away from the metallic workpieces when moving between a deactivated position and an activated position.

Additional aspects of the present disclosure are directed to techniques, algorithms, and control logic for operating any of the disclosed manufacturing systems or manufacturing any of the disclosed workpieces. Aspects of the present disclosure are also directed to traction battery packs containing stacked battery pouch cells with electrically conductive cell tabs that are formed in accordance with the disclosed concepts. Also presented herein are non-transitory, computer readable media storing instructions executable by at least one of one or more processors of one or more programmable control units, such as an electronic control unit (ECU) or control module, to govern operation of any disclosed apparatus or system.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

The present disclosure is amenable to various modifications and alternative forms, and some representative embodiments are shown by way of example in the drawings and will be described in detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for example, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Figure 1:
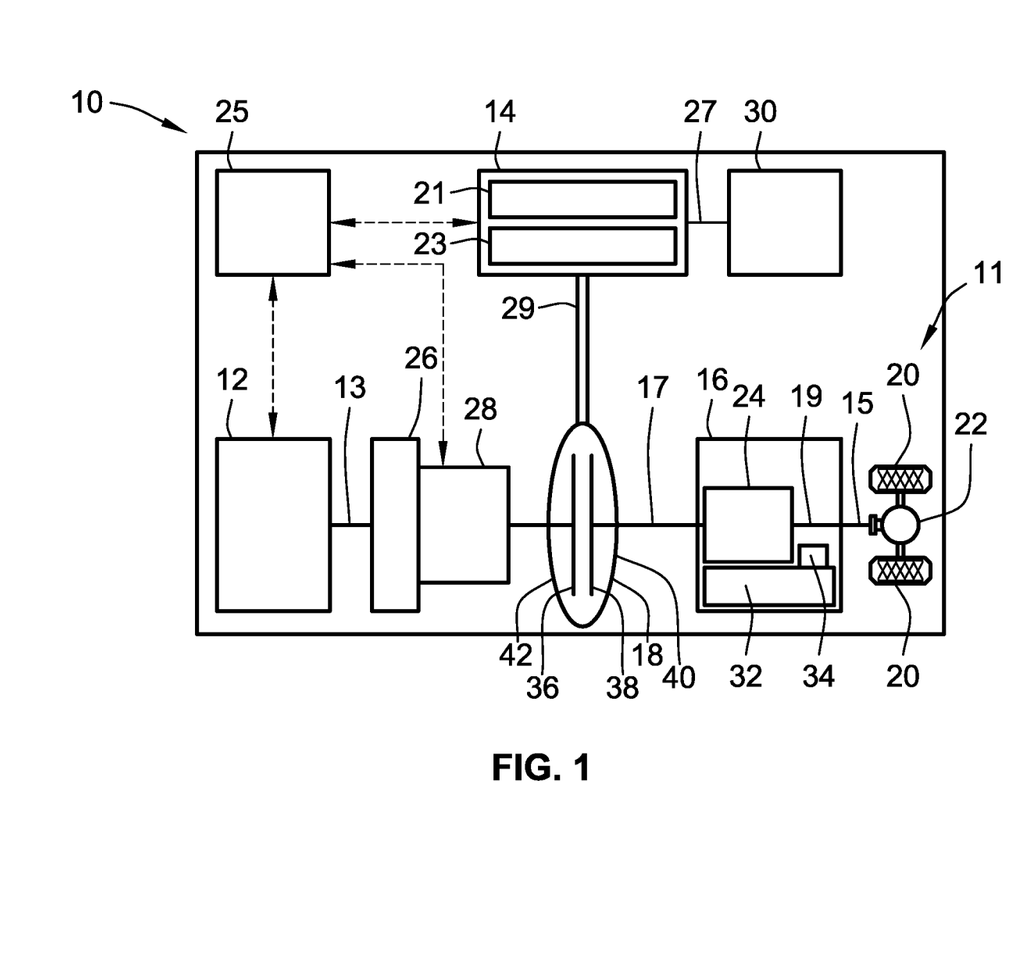
FIG. 1 is a schematic illustration of a representative electric-drive motor vehicle equipped with a hybrid powertrain having an electric traction motor powered by a rechargeable traction battery pack in accordance with aspects of the present disclosure.

Referring now to the drawings, wherein like reference numbers refer to like features throughout the several views, there is shown in FIG. 1 a schematic illustration of a representative automobile, which is designated generally at 10 and portrayed herein for purposes of discussion as a passenger vehicle with a parallel two-clutch (P2) hybrid-electric powertrain. The illustrated automobile 10—also referred to herein as "motor vehicle" or "vehicle" for short—is merely an exemplary application with which novel aspects and features of this disclosure may be practiced. In the same vein, implementation of the present concepts into a traction battery pack should also be appreciated as an exemplary application of the novel concepts disclosed herein. As such, it will be understood that facets and options of the present disclosure may be applied to other battery module configurations, incorporated into any logically relevant type of motor vehicle, and utilized for both automotive and non-automotive applications alike. Lastly, only select components have been shown and will be described in additional detail herein. Nevertheless, the vehicles, battery modules, and manufacturing systems discussed below may include numerous additional and alternative features, and other available peripheral components, for carrying out the various methods and functions of this disclosure.

The representative vehicle powertrain system is shown in FIG. 1 with a prime mover—represented herein by a restartable internal combustion engine (ICE) assembly 12 and an electric motor/generator unit 14—that is drivingly connected to a driveshaft 15 of a final drive system 11 by a multi-speed automatic power transmission 16. The engine 12 transfers power, preferably by way of torque via an engine crankshaft 13 ("engine output member"), to an input side of the transmission 16. According to the illustrated example, the ICE assembly 12 rotates an engine-driven torsional damper assembly 26 and, through the torsional damper assembly 26, an engine disconnect device 28. This engine disconnect device 28, when operatively engaged, transmits torque received from the ICE assembly 12, by way of the damper 26, to input structure of the TC assembly 18. As the name implies, the engine disconnect device 28 may be selectively disengaged to drivingly disconnect the engine 12 from the motor 14, TC assembly 18, and transmission 16.

The transmission 16, in turn, is adapted to receive, selectively manipulate, and distribute tractive power from the engine 12 and motor 14 to the vehicle's final drive system 11—represented herein by a driveshaft 15, rear differential 22, and a pair of rear road wheels 20—and thereby propel the hybrid vehicle 10. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28. It may be preferable, for at least some embodiments, that the engine disconnect device 28 comprise an active clutching mechanism, such as a controller-actuated selectable one-way clutch (SOWC) or friction-plate clutch, or a passive clutching mechanism, such as a ratchet-and-pawl or sprag-type freewheel OWC assembly.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit (MGU) 14 that operatively connects via a motor support hub, shaft, or belt 29 ("motor output member") to torque converter 18, and via torque converter 18 to an input shaft 17 ("transmission input member") of the transmission 16. The MGU 14 may be directly coupled to a TC input shaft or drivingly mounted to a housing portion of the torque converter 18. The electric MGU 14 is composed of an annular stator assembly 21 circumscribing and concentric with a cylindrical rotor assembly 23. Electric power is provided to the stator 21 through electrical conductors or cables 27 that pass through the motor housing via suitable sealing and insulating feedthroughs (not illustrated). Conversely, electric power may be provided from the MGU 14 to an onboard traction battery pack 30, e.g., through regenerative braking. Operation of any of the illustrated powertrain components may be governed by an onboard or remote vehicle controller or network of controllers, such as programmable electronic control unit (ECU) 25. While shown as a P2 hybrid-electric architecture, the vehicle 10 may employ other powertrain configurations, including FEV variants or P0, P1, P2.5, P3 and P4 hybrid powertrains, any of which may be adapted for a PHEV, range-extended hybrid vehicle, fuel-cell hybrid vehicle, etc.

Power transmission 16 may use differential gearing 24 to achieve selectively variable torque and speed ratios between transmission input shaft 17 and output shaft 19. One form of differential gearing is the epicyclic planetary gear arrangement. Planetary gearing offers the advantage of compactness and different torque and speed ratios among all members of the planetary gearing subset. Traditionally, hydraulically actuated torque establishing devices, such as clutches and brakes (the term "clutch" used to reference both clutches and brakes), are selectively engageable to activate the aforementioned gear elements for establishing desired forward and reverse speed ratios between the transmission's input and output shafts 17, 19. While envisioned as an 8-speed automatic transmission, the power transmission 16 may optionally take on other functionally appropriate configurations, including Continuously Variable Transmission (CVT) architectures, automated-manual transmissions, etc.

Hydrokinetic torque converter assembly 18 of FIG. 1 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 juxtaposed with a bladed turbine 38. The impeller 36 is situated in serial power-flow fluid communication with the turbine 38, with a stator (not shown) interposed between the impeller 36 and turbine 38 to selectively alter fluid flow therebetween. The transfer of torque from the engine 12 and motor 14 to the transmission 16 via the TC assembly 18 is through stirring excitation of hydraulic fluid inside the TC's internal fluid chamber caused by rotation of the impeller and turbine 36, 38 blades. To protect these components, the TC assembly 18 is constructed with a pump housing, defined principally by a transmission-side pump shell 40 fixedly attached, e.g., via electron beam welding, MIG or MAG welding, laser welding, and the like, to an engine-side pump cover 42 such that a working hydraulic fluid chamber is formed therebetween.

Figure 2:
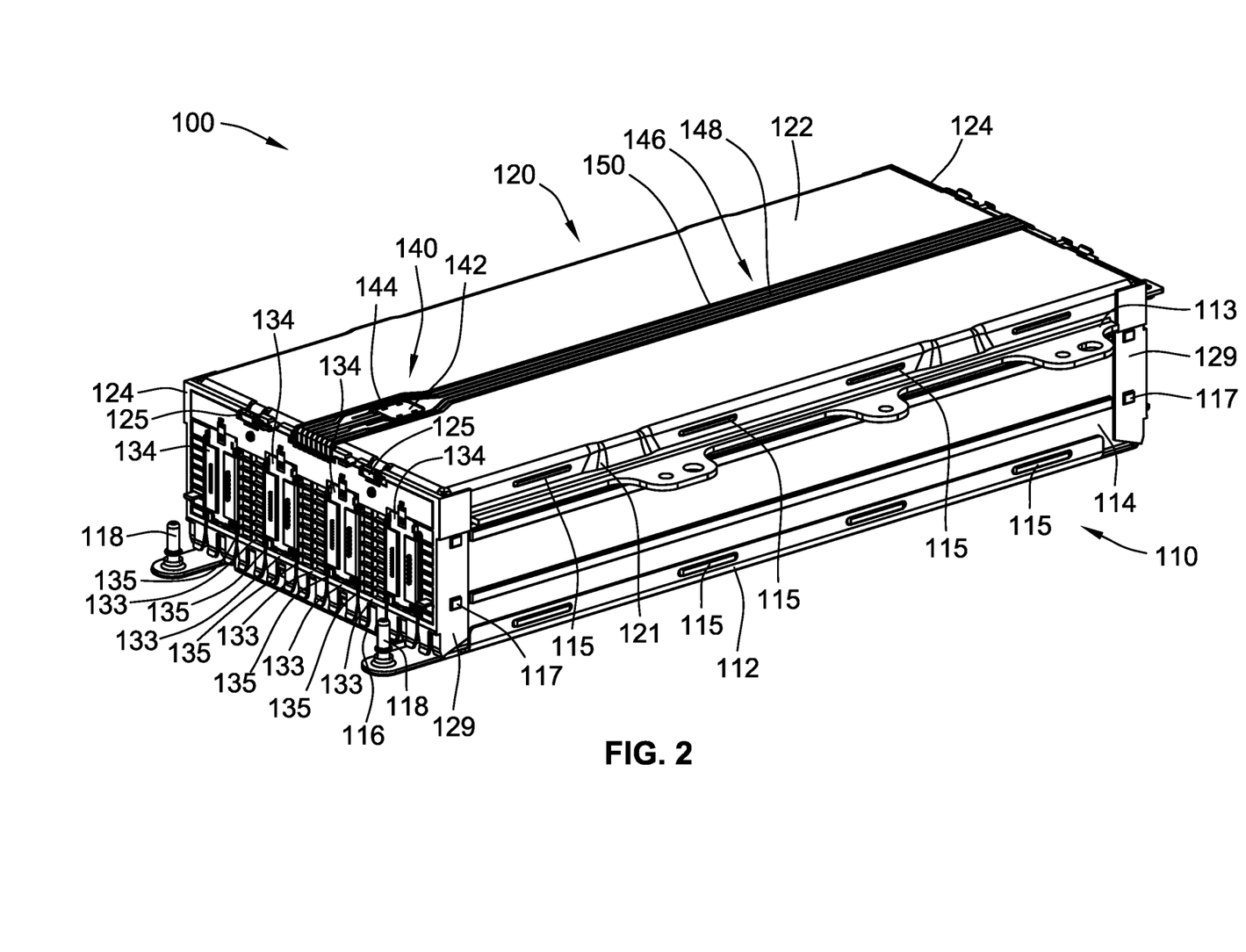
FIG. 2 is an elevated, perspective view illustration of a representative battery module with an integrated electrical ICB assembly and an internally packaged stack of battery pouch cells with cell tabs bent in accordance with aspects of the present disclosure.

Turning next to FIG. 2, there is shown a segment of a rechargeable energy storage system (RESS) that is adapted for storing and supplying high-voltage electrical energy used, for example, to propel an electric-drive vehicle, such as hybrid electric vehicle 10 of FIG. 1. This RESS may be a deep-cycle, high-ampere capacity vehicle battery system rated for approximately 350 to 800 VDC or more, for example, depending on a desired vehicle range, gross vehicle weight, and power ratings of the various accessory loads drawing electrical power from the RESS. To this end, the RESS employs one or more high-voltage, high-energy-density battery packs, such as traction battery pack 30 of FIG. 1, which is electrically connectable to one or more polyphase permanent magnet (PM) electric machines, such as traction motor 14. Each traction battery pack incorporates an aggregation (e.g., 100's or 1000's) of discrete electrochemical cells connected in series and/or parallel to achieve desired total voltage and total current requirements.

A traction battery pack is generally composed of an array of lithium-ion battery modules, an example of which is illustrated at 100 in FIG. 2. These battery modules 100 are buttressed on a battery support tray (not shown) that provides subjacent support for the battery pack during vehicle operation. Aspects of the disclosed concepts may be similarly applicable to other electric storage unit architectures, including those employing nickel metal hydride (NiMH) batteries, lead acid batteries, lithium polymer batteries, or other applicable type of rechargeable electric battery. Each battery module 100 may include a stack 102S of electrochemical battery cells, such as pouch-type lithium ion (Li-ion) or Li-ion polymer (LiPo) battery pouch cells 102 of FIG. 3, for example. For simplification of design and maintenance, and for reduction in cost and assembly time, each battery module 100 in the RESS may be substantially identical to one another.

Figure 3:
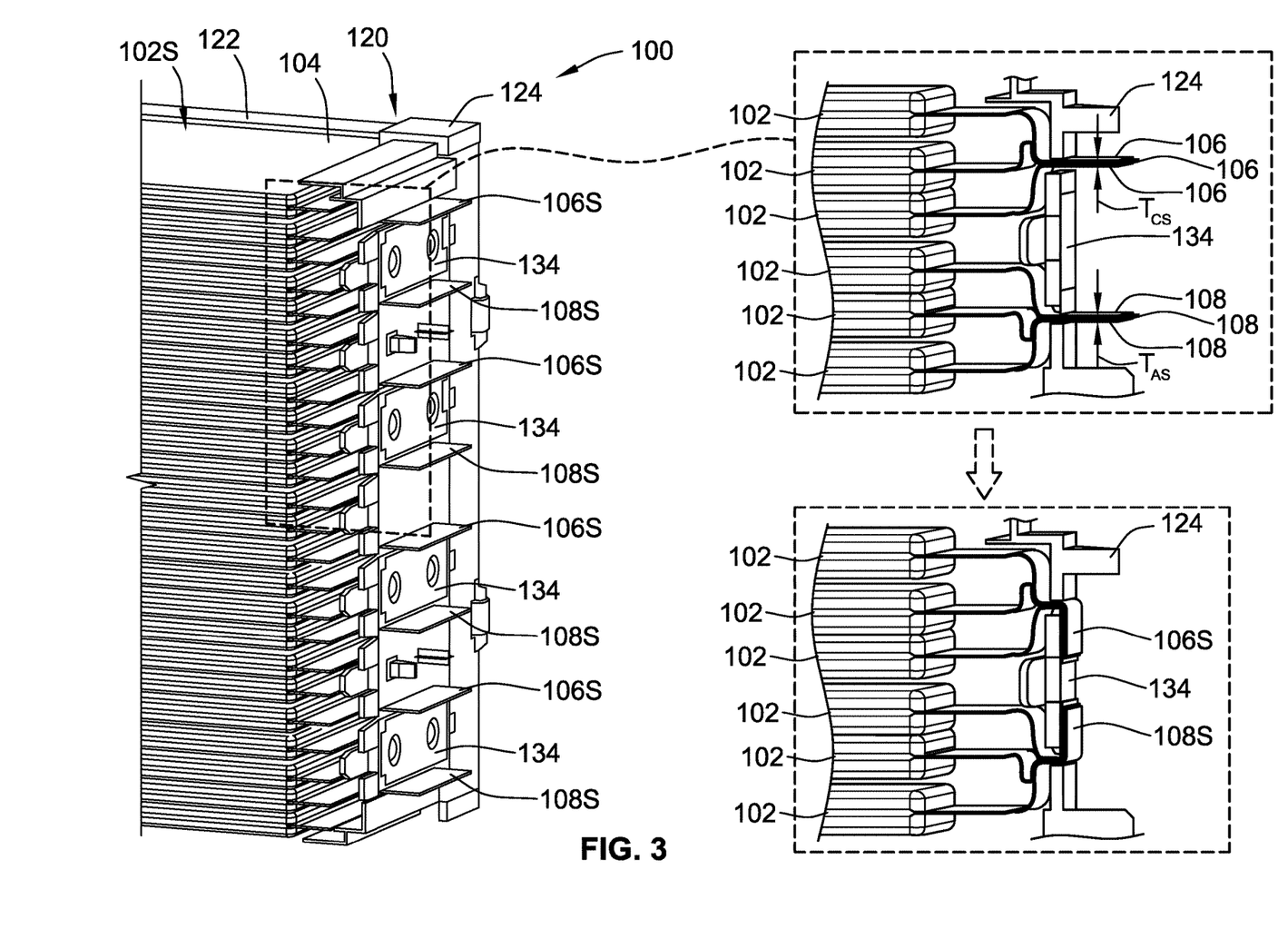
FIG. 3 is a perspective view illustration of the representative battery module of FIG. 2 with the module base plate and sidewalls removed to better illustrate the stacked battery pouch cells, and inset views showing the battery cell tabs before and after being bent in accord with aspects of the disclosed concepts.

An individual lithium-ion battery module 100 may be typified by multiple battery cells 102 (e.g., 20-30) that are stacked in side-by-side facing relation and connected in parallel or series for storing and supplying electrical energy. A battery cell may be a multi-layer construction that is provided with an outer battery casing, which is represented in the drawings by an envelope-like pouch 104 (FIG. 3). The respective sides of the pouch 104 may be formed of polymer foam, insulated aluminum sheet metal, or other suitable material. These two sides are connected, e.g., via welding or crimping, to generally enclose therein a liquid electrolyte composition that conducts positive Lithium ions between working and reference electrodes. Extending outwardly from opposing longitudinal ends of the pouch 104 are positive (cathode) and negative (anode) electrical terminals ("tabs") 106 and 108, respectively, for making electrical connections with positive and negative electrodes (not visible) packaged within the internal volume of pouch 104. While shown as a silicon-based, Li-ion "pouch cell" battery, the battery cells 102 may be adapted to other constructions, including cylindrical and prismatic constructions.

With collective reference to FIGS. 2 and 3, the battery module 100 stores the electrochemical battery cells 102 inside a protective, electrically insulating battery module housing 110. Battery module housing 110 may be a rigid, multi-part construction assembled from a housing base 112 and a pair of module sidewalls 114 that project orthogonally from the base 112. Once properly arranged and mounted, the stacked battery cells 102 are supported on the housing base 112 and sandwiched between the module sidewalls 114. For ease of manufacture and assembly, the sidewalls 114 may be substantially identical to each other, both formed from a rigid plastic material with snap fastener projections 115 and 117 for operatively aligning and mechanically connecting the sidewalls 114 with complementary segments of the battery module 100. Two coplanar mounting brackets 113 extend transversely from the module housing 110, each integrally formed with and projecting at a right angle from a respective module sidewall 114.

A cooling plate 116 is mounted underneath the stacked battery cells 102, seated generally flush against the bottom surface of the housing base 112, to selectively transfer heat out of the battery module 100. This cooling plate 116 is fabricated with one or more coolant channels (not visible in the views provided) that pass therethrough a coolant fluid received via coolant ports 118. The module sidewalls 114 and cooling plate 116 may be mechanically attached and fluidly sealed to the housing base 112, e.g., via snap fasteners and a seal-forming foam. It is envisioned that the battery module housing 110 may take on other sizes and shapes to accommodate alternative applications with different packaging and design constraints. In the same vein, the module housing 110 may be assembled from greater or fewer segments than that which are shown in the drawings; alternatively, the housing 110 may be molded and machined as a single-piece or bipartite, unitary structure.

Operatively aligning and electrically interconnecting the battery cells 102 is an integrated interconnect board (ICB) assembly 120 that is mounted on top of the battery module housing 110. In accord with the illustrated example, the ICB assembly 120 provides a protective outer jacket that is generally defined by a central cover 122 with a pair of flanged endwalls 124 that project generally orthogonally from opposing ends of the central cover 122. The central cover 122 is formed from a rigid polymeric material with integral lateral flanges 121 having elongated snap fastener slots, which receive therein snap fastener projections 115 of the housing sidewalls 114. A pair of snap-in hooks 125 projects from each longitudinal end of the cover 122 and receives therein mounting pivot pins (not labelled) of the ICB endwalls 124. ICB assembly endwalls 124 may be structurally identical, both formed from a rigid polymeric material that is similar to or distinct from the polymeric material used to fabricate the ICB cover 122. Each endwall 124 is fabricated with integral mounting flanges 129 that have snap fastener holes, which receive therein snap fastener projections 117 of the housing sidewalls 114.

Bottom ends of each of the ICB assembly endwalls 124 are segmented into a series of elongated, mutually parallel endwall plates 133 that are arranged side-by-side in a vertical column-like fashion. These endwall plates 133 interleave with and are separated from one another by elongated slots 135. Each endwall plate 133 is integrally formed with a succession of flexible snap fastener tabs (not labelled) that project downwardly from a bottom edge of the endwall 124. These tabs slidably engage with and press-fit onto the cooling plate 116; in so doing, the ICB assembly 120 mechanically attaches to the remainder of the battery module housing 110. In the illustrated embodiment, the ICB assembly 120 may be hermetically sealed to the module housing 110.

After mounting the integrated ICB assembly 120, the electrical tabs 106, 108 of the battery cells 102 are electrically connected to electrical busbar plates 134 mounted on the exterior faces of the ICB endwalls 124. As shown, each busbar plate 134 is fabricated from an electrically conductive material (e.g., copper) that is fashioned into a generally rectangular panel, which is then mounted on an exterior surface of an endwall 124, e.g., via mounting tabs, adhesives and/or fasteners. Likewise, the battery cell tabs 106, 108 are also fabricated from electrically conductive materials (e.g., Al and Cu) and bent into L-shaped terminals, an exterior portion of which lays flush again and solders, welds, or clips to one of the busbar plates 134. The inset views of FIG. 3 illustrate the battery cell tabs 106, 108 prior to bending (top inset view) and after bending (bottom inset view). L-shaped inter-module bussing brackets (not labelled) are mounted on the ICB endwalls 124 to electrically connect the battery module 100 to adjacent battery modules.

In addition to providing a protective jacket and electrically interconnecting the battery cells 102, the ICB assembly 120 also provides sensing, operating, and electrical isolation functionalities. Such functionality may be provided by an integrated circuit (IC) sensing assembly 140 that may be mounted on the central cover 122. The IC sensing assembly 140 is fabricated with multiple sensing devices 142, such as current, voltage, and/or temperature sensors, which are operable to sense operational characteristics of the battery cells 102. A flexible printed circuit board (PCB) 144 is shown mounted on the central cover 122, supporting thereon the sensing devices 142. A flexible electrical track 146 with multiple electrical traces 148 borne by an electrically insulating track sheet 150 electrically connects the flexible PCB 144 and, thus, the sensing devices 142 to the battery cells 102 via the busbar plates 134.

To package the battery pouch cells 102 within the module housing 110 such that the cell tabs 106, 108 may be grouped into sets and electrically mated with the busbar plates 134, a multistage "cluster-and-bend" press system 200 or 300 (also referred to herein as "metalworking system") groups and bends the battery cell tabs 106, 108 (also referred to herein as "metallic workpieces") into a desired "final" bend profile with a reduced "final" tab set length. While differing in appearance, it is envisioned that many features and options disclosed herein with reference to the multistage press system 200 of FIG. 4 may be incorporated, singly or in any combination, into the multistage press system 300 of FIG. 5, and vice versa. As a point of similarity, both the press system 200 of FIG. 4 and the press system 300 of FIG. 5A are generally composed of: (1) a grouping tool that operatively aligns adjacent a workpiece support structure (e.g., housing base 112) and selectively presses together a stack of metallic workpieces (e.g., battery cell tabs 106, 108) to thereby form one or more workpiece sets (e.g., multiple three-tab sets illustrated in FIG. 3) having an initial (first) bend profile and set length; and (2) a contouring tool that is mounted on, integrally formed with, or otherwise attached to the grouping tool and operable to selectively bend each workpiece set to a final (second) bend profile and set length, which are distinct from the initial bend profile and length. As another point of similarity, both systems 200, 300 may be manually operated, e.g., via a trained technician, or automated, e.g., via system controller and one or more pneumatic, hydraulic, and/or electric actuators.

Figure 4:
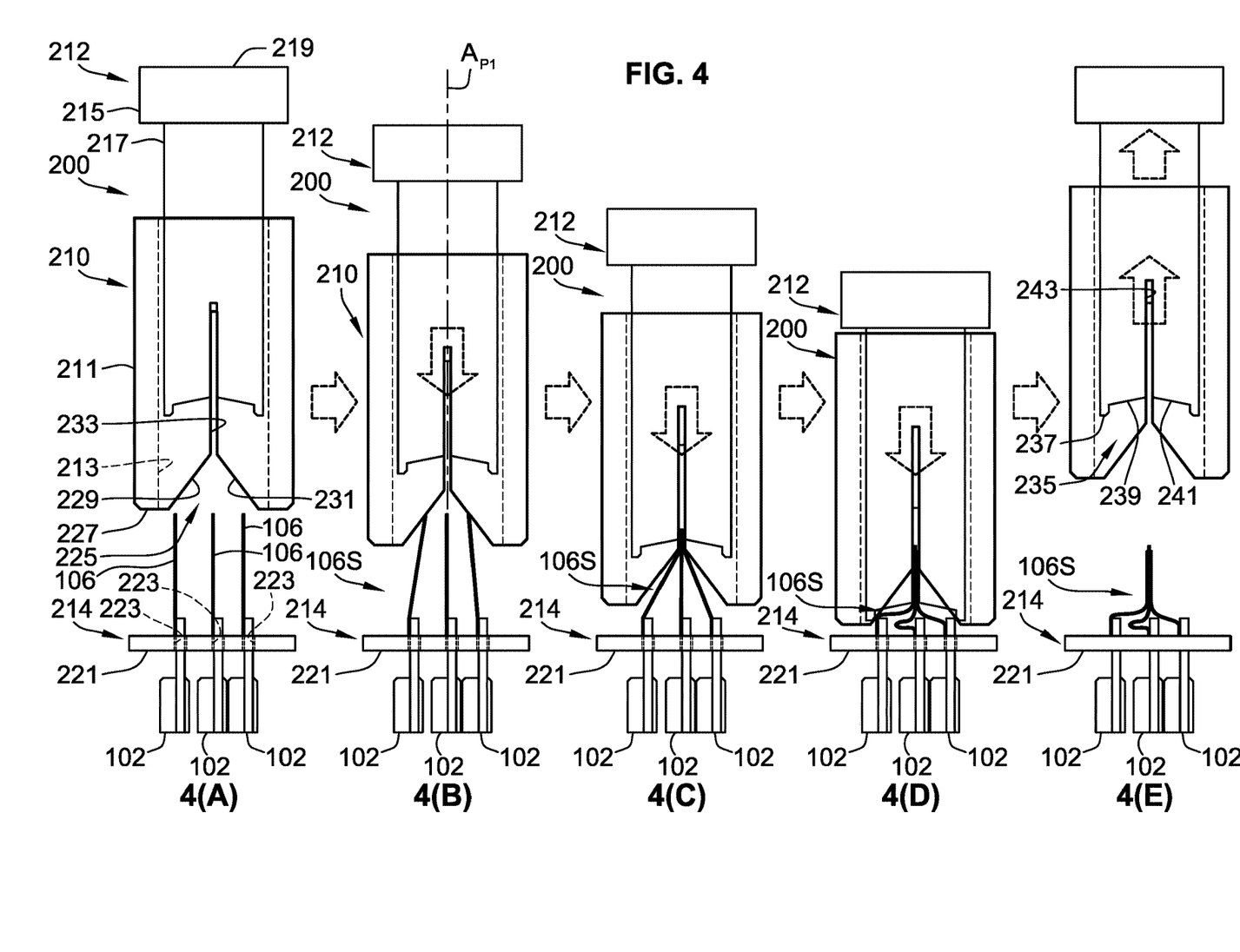
FIG. 4 is a workflow diagram illustrating a representative method for bending metallic workpieces, such as the battery cell tabs of FIGS. 2 and 3, with a representative multistage metalworking system in accord with aspects of the disclosed concepts.
Figure 5:
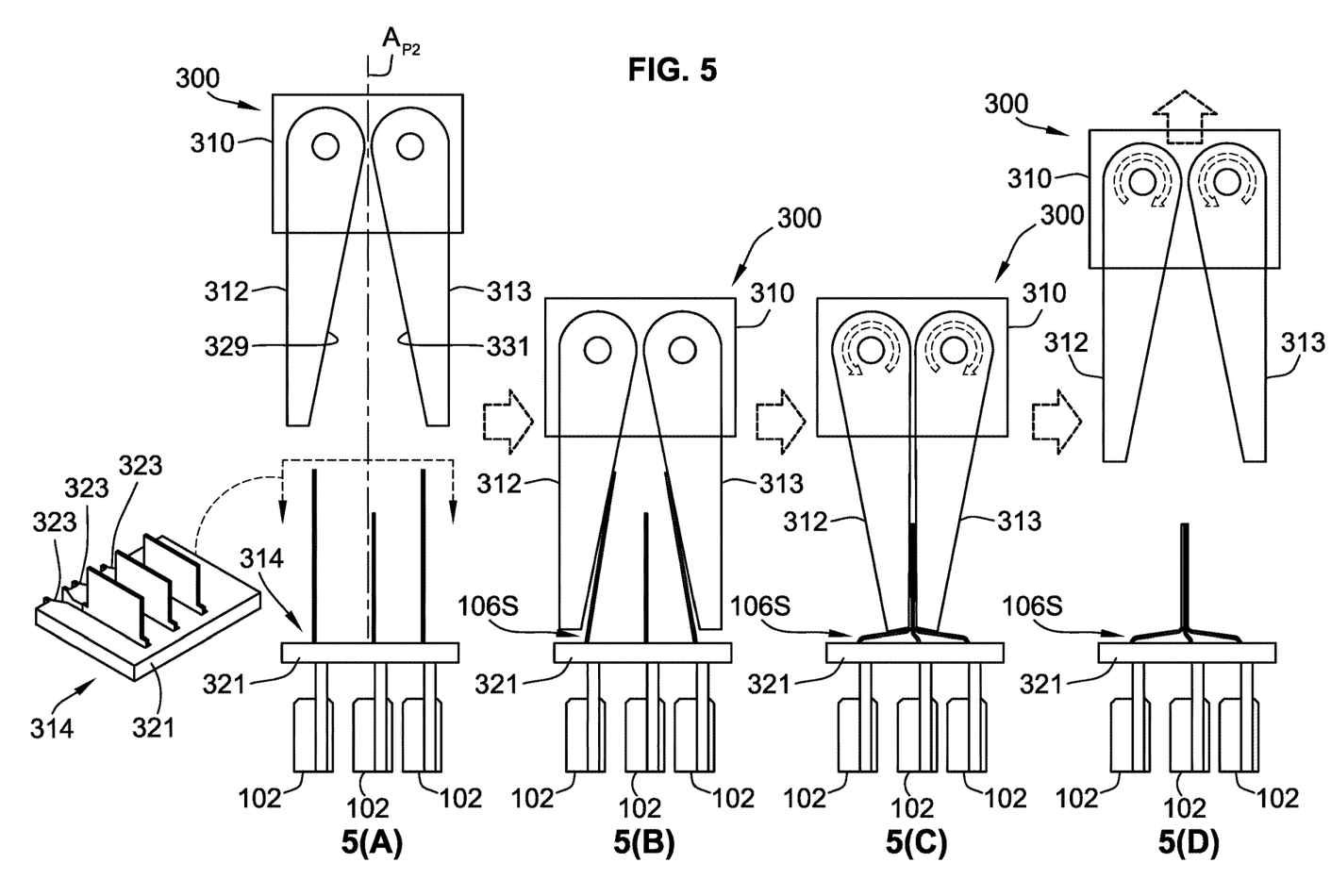
FIG. 5 is a workflow diagram illustrating another representative method for bending metallic workpieces, such as the battery cell tabs of FIGS. 2 and 3, with another representative multistage metalworking system in accord with the disclosed concepts.

By way of demarcation, the multistage press system 200 of FIG. 4 is generally composed of a telescoping pair of die-forming plungers: a tab-grouping (first) plunger 210 ("outer bend platen") that segregates the individual cell tabs into their proper sets and fashions an initial bend profile into each set; and a tab-contouring (second) plunger 212 ("inner bend platen") that fashions a final bend profile into each tab set and sets a height of the bend profile to clear the interior of the ICB endwalls. The illustrated multistage press system 200 is designed to bend twenty-four (24) battery cell tabs 106, 108 into eight (8) sets of three (3) stacked tabs 106S, 108S at one time. In the workflow steps 4(A) to 4(E) of FIG. 4, the multistage press system 200 is shown mating a stack of three immediately adjacent battery cell tabs 106 into a single cell tab set 106S. It should be appreciated, however, that disclosed press systems may be modified to simultaneously bend greater or fewer battery cell tabs into any desired number of cell tab sets, e.g., to accommodate different battery module sizes and configurations.

With continuing reference to FIG. 4, the tab-grouping plunger 210 includes or, in at least some architectures, consists essentially of a unitary, single-piece (first) plunger body 211. To ensure sufficient structural resilience for systematic and repeated bend operations, the plunger body 211 is fabricated from a rigid and wear-resistant material, such as high-strength plastics (e.g., thermoplastic polycarbonate), electrically insulated metallic materials (e.g., dielectric-polymer coated steel), or advanced ceramics (e.g., alumina or silicon carbide). The plunger body 211 is a hollow structure, with a rectangular-polyhedral exterior and a central plunger passage 213 that extends completely through the plunger body 211. Opposing top and bottom ends of the passage 213 terminate at openings through top-most and bottom-most surfaces of the plunger body 211, respectively. For at least some alternative architectures, the plunger passage 213 is omitted such that the plunger body 211 is a solid structure, and the two plungers 210, 212 may be located immediately adjacent each other and juxtaposed in face-to-face sliding contact.

Similar to the tab-grouping plunger 210, the tab-contouring plunger 212 of FIG. 4 includes or, in at least some architectures, consists essentially of a unitary, single-piece (second) plunger body 215 that is fabricated from a rigid and wear-resistant plastic, electrically insulated metal, or advanced ceramic, including any of the examples presented in the preceding paragraph. This plunger body 215 may be a toothed structure, with at least one or, if so desired, a series of mutually parallel legs 217. Each elongated "plinth-like" leg 217 is integrally formed with and projects generally orthogonally (in a downward direction in FIG. 4) from a plunger crown 219, spaced from neighboring legs 217 by an intermediate gap. While described with eight (8) identically shaped legs 217, it should be appreciated that the tab-contouring plunger 212 may be provided with greater or fewer legs, each of which may take on a common or a distinct structural configuration.

In addition to the telescoping plungers 210, 212 described in the preceding paragraphs, the multistage press system 200 may optionally include a rigid plunger fixture 214 that fixedly attaches on the battery module housing 110 or other similarly suitable workpiece support structure. For instance, the plunger fixture 214 may seat against the housing base 112 and/or sidewalls 114, and mate with complementary locating features, such that the multistage press system 200 extends across and covers the battery cell tabs 106, 108 projecting from one end of the module housing 110. The illustrated plunger fixture 214 includes a substantially flat, rectangular comb platen 221 (best seen in inset view of FIG. 5) with a series of mutually parallel, elongated slots 223. After the housing base 112 is laid flat and the cells 102 stacked with the tabs 106, 108 projecting horizontally from opposing ends of the open module housing 110, the plunger fixture 214 is vertically lowered onto the cell stack 102S and combs the cells 102 such that each slot 223 receives therethrough one of the battery cell tabs 106, 108. One or more biasing members, which may be in the nature of corner-mounted helical compression springs (not shown), may optionally spring-mount the plungers 210, 212 to the plunger fixture 214. The comb platen 221 helps to align and hold the cell tabs 106, 108 in position for completion of the subsequent forming operations, helps to prevent the tabs 106, 108 from inadvertently collapsing, isolates the desired bend point for the tabs 106, 108, and provides a positive stop for the upper tooling.

To isolate and bend the group or groups of cell tabs 106, 108, the tab-grouping plunger 210 is formed with at least one or, if so desired, a series of (first) die cavities 225 that are recessed into a battery-stack-facing, workpiece engaging (first) contact face 227 of the plunger body 211. While not per se required, these die cavities 225 may be substantially identical to help ensure consistent group-to-group initial bend geometries. The die cavity 225 includes a pair of (first and second) ramped cavity surfaces 229 and 231, respectively; these surfaces 229 and 231 are located in spaced face-to-face relation, oriented at an acute angle with each other. After attaching the fixture 214 to the housing 110 and aligning the plungers 210, 212 with the tabs 106 at process operation 4(A), the tab-grouping plunger 210 translates (e.g., in a downward direction in FIG. 4) along a rectilinear plunger axis $A_{P1}$ towards the battery cells 102 when moving from a deactivated position towards an activated position, at process operation 4(B). After the contact face 227 contacts the distal tips of the tabs 106, the cavity surfaces 229 and 231 press against and bend the left and right tabs 106 in a clockwise and counterclockwise direction, respectively, at process operation 4(C). A central (first) elongated slot 233, which is interposed between and segregates the two cavity surfaces 229, 231, slidably receives therein the distal ends of the battery cell tabs 106 when the plunger 210 reaches the activated position.

Similar to the tab-grouping plunger 210, the tab-contouring plunger 212 of FIG. 4 is formed with at least one or, if so desired, a series of (second) die cavities 235 that are recessed into a battery-stack-facing, workpiece engaging (second) contact face 237 of the plunger body 215. The aforementioned die cavities 235 may be substantially identical for configurations with multiple plunger body legs 217 to help ensure consistent group-to-group final bend geometries. The die cavity 235 includes a pair of (third and fourth) ramped cavity surfaces 239 and 241, respectively; these surfaces 239, 241 are located in spaced opposing relation, oriented at an obtuse angle with each other. After the tabs 106 are segregated into a tab set 106S and an initial bend geometry is imparted thereto at process operations 4(A)-4(C), the tab-contouring plunger 212 translates (e.g., in a downward direction in FIG. 4) along the rectilinear plunger axis $A_{P1}$ towards the battery cells 102 when moving from a de-actuated position towards an actuated position, at process operation 4(D). After the contact face 237 contacts intermediate segments of the tabs 106, the cavity surfaces 239 and 241 press against and bend the tab set 106S to the final bend geometry. A central (second) elongated slot 243 in the plunger body 215, which is interposed between and segregates the two cavity surfaces 239, 241, slidably receives therein a distal end of the tab set 106S when the plunger 212 reaches the actuated position. Upon completion of the final bend geometry, the plungers 210, 212 are retracted (e.g., in an upward direction in FIG. 4) along the rectilinear plunger axis $A_{P1}$ away from the battery cells 102, at process operation 4(E).

Turning next to FIG. 5, the multistage press system 300 is generally composed of a reciprocating plunger head 310 that movably mounts adjacent the battery module housing 110 or a functionally equivalent workpiece support structure, and at least one pair of (first and second) plunger fingers 312 and 313 rotatably mounted onto the plunger head 310. It may be desirable, for at least some applications, that the multistage press system 300 employ eight (8) pairs of plunger fingers 312, 313, each of which is operable to bend a respective set of three (3) cell tabs 106 into a distinct tab set 106S. The plunger head 310 selectively transitions from a deactivated position, displaced away from the battery pouch cells 102 (vertically upwards in FIG. 5), to an activated position, forced towards the cells 102 (vertically downwards in FIG. 5). In the workflow steps 5(A) to 5(C) of FIG. 5, the multistage press system 300 is shown mating a stack of three immediately adjacent battery cell tabs 106 into a single cell tab set 106S; however, each tab set may comprise greater or fewer than three individual tabs.

Similar to the multistage press system 200 of FIG. 4, the system 300 of FIG. 5 may be equipped with an optional rigid plunger fixture 314, which may be substantially identical to the plunger fixture 214 described above. By way of example, and not limitation, the plunger fixture 314 of FIG. 5 may seat against the base 112 and/or sidewalls 114 of the battery module housing 110 such that the multistage press system 300 extends over and across the tabs 106, 108 projecting from the housing 110. This plunger fixture 314 includes a substantially flat, rectangular comb platen 321 with a series of mutually parallel, elongated slots 323 with terminal ends thereof that open along one edge of the platen 321. At process operation 5(A), the plunger fixture 314 is passed transversely across exposed end of the cell stack 102S such that the platen 321 combs the cells 102 and each slot 323 receives a respective one of the battery cell tabs 106, 108.

After attaching the fixture 314 to the housing 110 and aligning the fingers 312, 313 with the tabs 106 at process operation 5(A), the plunger head 310 translates (e.g., in a downward direction in FIG. 4) along a rectilinear plunger axis $A_{P2}$ towards the battery cells 102 when moving from a deactivated position towards an activated position, at process operation 4(B). During this plunging motion, opposing contact surfaces 329 and 331 on interior faces of the plunger fingers 312, 313 simultaneously press against and bend the left and right tabs 106. In so doing, the left and right tabs 106 are bent towards each other in clockwise and counterclockwise directions, respectively, thereby segregating the tabs 106 into a tab set 106S and imparting an initial bend geometry thereto. At process operation 5(C), the left (first) plunger finger 312 swivels in a counterclockwise (first) direction to thereby press against and bend the tab set 106S. At the same time, the right (second) plunger finger swivels in a clockwise (second) direction to thereby press against and bend the tab set 106S. Upon completion of the final bend geometry, the plunger fingers 312, 313 are rotated back to their original positions and the plunger head 310 is retracted (e.g., in an upward direction in FIG. 5) away from the battery cells 102, at process operation 5(D).

Prior techniques for pre-forming battery cell tabs before insertion into the battery module housing necessitated multiple tab bending operations be individually performed on each of the cells prior to cell stacking. As a result, prior manufacturing systems employed several discrete bend stations and multiple distinct bend die sets to achieve the desired "final" bend profile. This, in turn, demanded separate feed-up conveyance, cell sequencing, and track & trace protocols during the assembly process to ensure proper cell placement within the module housing. In addition, module packing constraints often force tab bend profiles to have tight tolerances, e.g., to ensure there is proper tab-to-tab alignment and the bends conform to the available space under the ICB. Some commercially available lithium-polymer battery pouch cells have an overall cell and tab-to-tab length with a large tolerance (e.g., ±1.5 mm); however, the tab bend profile within the module may have a significantly smaller tolerance (e.g., 0.5±0.1 mm), which creates a "red stack" issue.

To cure the foregoing deficiencies, at least some of the disclosed metalworking systems employ a single tool assembly that simultaneously forms all of the cell tabs on a given end of the battery module. In so doing, these metalworking systems help to eliminate individual tab bending operations, which reduces base engineering content (BEC) and eliminates the need for multiple bend stations with multiple distinct bend dies. Each tool assembly may be indexed to a respective module end after the cells are stacked on the module base plate such that the tabs are pre-formed after the module has been stacked. Disclosed systems, methods and devices may also help to compensate for varying cell positions in the stack, and offset the "marshmallow effect" caused by variances in foam compression spacing.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, solid state memory, a hard drive, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A metalworking system for forming first and second metallic workpieces aligned on a support structure, the metalworking system comprising:
    a grouping tool configured to align adjacent the support structure and press together the first and second metallic workpieces to thereby form a workpiece set having a first bend profile and a first set length; and
    a contouring tool attached to the grouping tool and configured to bend the workpiece set to a second bend profile, distinct from the first bend profile, and a second set length, shorter than the first set length;
    wherein the grouping tool includes a first plunger with a first plunger body having a first die cavity recessed into a first contact face of the first plunger body, the first contact face being configured to simultaneously contact the first and second metallic workpieces.

2. The metalworking system of claim 1, wherein the first die cavity includes first and second cavity surfaces configured to simultaneously press against and bend towards each other the first and second metallic workpieces, respectively, to thereby form the workpiece set.

3. The metalworking system of claim 2, wherein the first die cavity further includes a first elongated slot segregating the first and second cavity surfaces and configured to slidably receive therein distal ends of the first and second metallic workpieces.

4. The metalworking system of claim 2, wherein the contouring tool includes a second plunger movably coupled to the first plunger, the second plunger including a second plunger body having a second die cavity recessed into a second contact face of the second plunger body, the second contact face being configured to simultaneously contact the first and second metallic workpieces of the workpiece set.

5. The metalworking system of claim 4, wherein the second die cavity includes third and fourth cavity surfaces configured to simultaneously press against and bend the workpiece set and thereby impart the second bend profile with the second set length.

6. The metalworking system of claim 5, wherein the second die cavity further includes a second elongated slot segregating the third and fourth cavity surfaces and configured to slidably receive therein distal ends of the first and second metallic workpieces.

7. The metalworking system of claim 4, wherein the first plunger includes a plunger passage extending through the first plunger body, and the second plunger is slidably mounted to the first plunger with the second plunger body moving within the plunger passage such that the second plunger bends the first and second metallic workpieces in tandem with the first plunger bending the first and second metallic workpieces.

8. The metalworking system of claim 1, further comprising a plunger fixture configured to mount to the support structure adjacent the first and second metallic workpieces and align the grouping and contouring tools with the first and second metallic workpieces.

9. The metalworking system of claim 8, wherein the plunger fixture includes a comb platen with first and second elongated slots each configured to receive therethrough a respective one of the first and second metallic workpieces.

10. The metalworking system of claim 1, wherein the grouping tool includes a plunger head configured to movably mount adjacent the support structure, the plunger head including first and second contact surfaces configured to simultaneously bend the first and second metallic workpieces, respectively, towards each other to thereby form the workpiece set.

11. A method for forming first and second metallic workpieces aligned_on a support structure, the method comprising:
    aligning, adjacent the support structure, a grouping tool and a contouring tool attached to the grouping tool;
    plunging the grouping tool towards the support structure to press together the first and second metallic workpieces to thereby form a workpiece set having a first bend profile and a first set length; and
    activating the contouring tool to thereby bend the workpiece set to a second bend profile, distinct from the first bend profile, with a second set length, shorter than the first set length;
    wherein the grouping tool includes a first plunger with a first plunger body having a first die cavity recessed into a first contact face of the first plunger body, and wherein the first die cavity includes first and second cavity surfaces configured to simultaneously bend towards each other the first and second metallic workpieces, respectively, to thereby form the workpiece set.

12. The method of claim 11, wherein the first die cavity further includes a first elongated slot segregating the first and second cavity surfaces and configured to slidably receive therein distal ends of the first and second metallic workpieces.

13. The method of claim 11, wherein the contouring tool includes a second plunger movably coupled to the first plunger, the second plunger including a second plunger body having a second die cavity recessed into a second contact face of the second plunger body, and wherein the second die cavity includes third and fourth cavity surfaces configured to simultaneously bend the workpiece set and thereby impart the second bend profile with the second set length.

14. The method of claim 13, wherein the second die cavity further includes a second elongated slot segregating the third and fourth cavity surfaces and configured to slidably receive therein distal ends of the first and second metallic workpieces.

15. The method of claim 13, wherein the first plunger includes a plunger passage extending through the first plunger body, and the second plunger is slidably mounted to the first plunger with the second plunger body moving within the plunger passage such that the second plunger bends the first and second metallic workpieces in tandem with the first plunger bending the first and second metallic workpieces.

* * * * *